US008318045B2

(12) United States Patent
Kim et al.

(10) Patent No.: US 8,318,045 B2

(45) Date of Patent: Nov. 27, 2012

(54) RADIATION SHIELDING MEMBERS INCLUDING NANO-PARTICLES AS A RADIATION SHIELDING MATERIAL AND METHOD FOR PREPARING THE SAME

(75) Inventors: Jaewoo Kim, Daejeon (KR); Young Rang Uhm, Daejeon (KR); Byungchul Lee, Daejeon (KR); Jinwoo Jung, Seoul (KR); Chang Kyu Rhee, Daejeon (KR); Min-Ku Lee, Daejeon (KR); Hee Min Lee, Seoul (KR); Sang Hoon Lee, Daejeon (KR)

(73) Assignee: Korea Atomic Energy Research Institute, Daejeon (KR)

( * ) Notice: Subject to any disclaimer, the term of this patent is extended or adjusted under 35 U.S.C. 154(b) by 528 days.

(21) Appl. No.: 12/464,733

(22) Filed: May 12, 2009

(65) Prior Publication Data

US 2010/0102279 A1 Apr. 29, 2010

(30) Foreign Application Priority Data

Oct. 29, 2008 (KR) ........................ 10-2008-0106438

(51) Int. Cl.

| | |
|---|---|
| ***G21F 1/10*** | (2006.01) |
| ***G21F 1/08*** | (2006.01) |
| ***G21F 3/00*** | (2006.01) |
| ***C08K 3/38*** | (2006.01) |
| ***C22C 32/00*** | (2006.01) |

(52) U.S. Cl. ........ 252/478; 524/401; 524/404; 524/405; 75/315; 75/316; 75/238; 75/244; 419/12; 419/20; 420/14; 420/30; 420/64; 420/563

(58) Field of Classification Search .................. 252/478; 524/401, 404, 405; 75/315, 316, 238, 244; 419/12, 20; 420/14, 30, 64, 563

See application file for complete search history.

(56) References Cited

U.S. PATENT DOCUMENTS 3,194,239 A 7/1965 Sullivan (Continued)

FOREIGN PATENT DOCUMENTS

KR 10-2004-0048588 6/2004

(Continued)

OTHER PUBLICATIONS

Taylor, E., "Organics, polymers and nanotechnology for radiation hardening and shielding applications," *Nanophotonics and Macrophotonics for Space Environments* (2007) 6713: 671307-1-671307-10.

(Continued)

*Primary Examiner* — Joseph D Anthony

(74) *Attorney, Agent, or Firm* — Merchant & Gould P.C.

(57) ABSTRACT

Disclosed is a radiation shielding member having improved radiation absorption performance, including 80.0~99.0 wt % of a polymer matrix or metal matrix and 1.0~20.0 wt % of a radiation shielding material in the form of nano-particles having a size of 10~900 nm as a result of pulverization, wherein the radiation shielding material is homogeneously dispersed in the matrix through powder mixing or melt mixing after treatment with a surfactant which is the same material as the matrix or which has high affinity for the matrix. A preparation method thereof is also provided. This radiation shielding member including the nano-particles as the shielding material further increases the collision probability of the shielding material with radiation, compared to conventional shielding members including micro-particles, thus reducing the mean free path of radiation in the shielding member, thereby exhibiting superior radiation shielding effects. At the same density, the shielding member has reduced thickness and volume and is thus lightweight. The porosity of the shielding member is minimized, thereby preventing the deterioration of shielding effects and properties of the shielding member and realizing applicability in spent fuel managing transport/storage environments and the like.

13 Claims, 6 Drawing Sheets

U.S. PATENT DOCUMENTS

| | | | | |
|---|---|---|---|---|
| 6,281,515 | B1 | 8/2001 | Demeo et al. | |
| 6,459,091 | B1 | 10/2002 | DeMeo et al. | |
| 6,652,801 | B2 * | 11/2003 | Parker | 264/605 |
| 2003/0173693 | A1 * | 9/2003 | Parker | 264/5 |
| 2008/0233626 | A1 * | 9/2008 | Li | 435/173.1 |
| 2010/0086728 | A1 * | 4/2010 | Theurl et al. | 428/113 |
| 2010/0265019 | A1 * | 10/2010 | Groeppel et al. | 335/216 |

FOREIGN PATENT DOCUMENTS

| | | |
|---|---|---|
| KR | 10-2004-0048589 | 6/2004 |
| KR | 10-2006-0094712 | 8/2006 |
| KR | 10-0845055 B1 | 7/2008 |
| KR | 10-0846840 | 7/2008 |
| KR | 10-0860333 | 9/2008 |

OTHER PUBLICATIONS

Kim et al., "Development of Nano-borated polymeric materials for neutron shielding," *The 1st Annual International Symposium on Hybrid Materials and Processing* (Oct. 27-29, 2008) Busan, Korea.

Kim et al., "Investigation of particle size-dependent neutron shielding efficiency," *Recent Developments and Applications of Nuclear Technologies—Conference Abstracts* (Sep. 15-17, 2008) Bialowieza, Poland.

Kim et al., "Neutron shielding characteristics of nano-$B_2O_3$ dispersed poly vinyl alcohol," *Transactions of the Korean Nuclear Society Spring Meeting* (May 29-30, 2008) Gyeongju, Korea.

Uhm et al., "Rapid synthesis of core-shell nanoparticles of B4C and poly vinyl alcohol (PVA)," *The 9th International Symposium on Nanocomposites & Nanoporous Materials* (*ISNNM9*) (May 14-16, 2008) Gyeongju, Korea.

Kim et al., "Development of radiation shielding material using an ultra-fine boron dispersed polymer matrix," *Nuclear Power R&D Program Nu-Tech 2015 Conference* (Sep. 4, 2008) Jeju Kumho Resort.

* cited by examiner (a)

(b)

(a)

(b)

(b)

RADIATION SHIELDING MEMBERS INCLUDING NANO-PARTICLES AS A RADIATION SHIELDING MATERIAL AND METHOD FOR PREPARING THE SAME

CROSS-REFERENCE TO RELATED APPLICATION

This patent application claims the benefit of Korean Patent Application Nos. 10-2008-0106438 filed Oct. 29, 2008, the contents of which are incorporated herein by reference. A claim of priority to all, to the extent appropriate is made.

BACKGROUND OF THE INVENTION

1. Field of the Invention

The present invention relates to a radiation shielding members including nano-particles as a radiation shielding material and to a method for preparing the same.

2. Description of the Related Art

Radiation is largely classified into ionizing radiation and non-ionizing radiation, while radiation typically designates ionizing radiation in general.

Ionizing radiation includes alpha rays, beta rays, protons, neutrons, gamma rays and X-rays, which cause ionization when passing through the matter, and is specifically divided into direct ionizing radiation and indirect ionizing radiation. Examples of direct ionizing radiation include alpha rays, beta rays and protons, which have an ability to directly ionize the matter, and examples of indirect ionizing radiation include X-rays, gamma rays, and neutrons, which have no ability to directly ionize the matter but are capable of indirectly ionizing the matter through interaction with the matter.

Non-ionizing radiation whose energy is relatively low to such an extent that charged ions are not produced or an ionization probability is very low when passing through the matter, and examples thereof include infrared rays, visible rays, and UV rays.

Alpha rays are absorbed and blocked by a material having a thickness comparable to that of a sheet of paper, and may be instantly stopped in the air, thus obviating a need to be additionally shielded. The beta rays are known to have energy lower than that of the alpha rays in most cases and may be halted even by a thin aluminum foil or a plastic sheet.

Gamma rays whose energy is greater than that of the X-rays are electromagnetic waves generated from nuclear disintegration or transmutation, and have great penetrating power. Such gamma rays and X-rays may be blocked with concrete or a high-density metallic material such as iron or lead. In the case where the metallic material is used, problems in which the weight of the shielding member is undesirably increased owing to the high density of the metallic material incur.

Neutrons are generated due to nuclear disintegration or fission and are in an uncharged state. In the case of fast neutrons, however, energy is high to the level of 1 MeV or higher, and thus, in order to decelerate the fast neutrons, a material containing a large amount of hydrogen having a mass similar to that of a neutron may be used in combination. Further, there is required a shielding member containing a neutron absorbing material for absorbing thermal neutrons having low energy (~0.025 eV) resulting from the deceleration of the fast neutrons.

In particular, gamma rays, X-rays or neutrons directly act on atoms or molecules, thus changing the main structure of DNA or proteins. When this type of radiation acts on the generative cell of a living organism, a probability for inducing mutation to thus bring about malformation and malfunction may be increased. In the case where this type of radiation acts on the adult organism, a disease such as cancer may be caused. Moreover, thermal neutrons make the surrounding material radioactive to thus pollute the surrounding environment with radioactivity. Hence, the area to which radiation is applied essentially requires a radiation shielding member able to shield gamma rays, X-rays or neutrons harmful to the human body and the environment.

Conventionally, gamma rays or X-rays shielding member is known to be imparted with shielding effects by using a material containing iron, lead, and concrete. On the other hand, a neutron shielding member is known to be a mixture of a polymer or metal matrix and a compound including a material having a large thermal neutron absorption cross-section, such as boron, lithium and gadolinium having the ability to absorb thermal neutrons. For example, Korean Patent Publication No. 10-2006-0094712 discloses a shielding member using high-density polyethylene as a polymer matrix in which boron known to absorb thermal neutrons and lead known to decay gamma rays are mixed together in order to be easily processed and shield from both neutrons and gamma rays. However, the above patent does not recognize the fact that the particle size of the radiation shielding material has a great influence on radiation shielding performance.

To date, the performance of the radiation shielding member is known to be determined merely by the properties of radiation shielding material (depending on absorption cross-section in the case of neutrons, or depending on the decay constant in the case of gamma or X-rays), the amount of radiation shielding material in the matrix, and the thickness of the shielding member. The particle size of the radiation shielding material is not known to greatly affect the radiation shielding performance. Further, there is no report related to the preparation of a radiation shielding member using homogeneous dispersion of a radiation shielding material in the form of nano-particles in a polymer matrix.

SUMMARY OF THE INVENTION

Leading to the present invention, thorough research carried out by the present inventors aiming to solve the problems encountered in the related art, resulted in the finding that nano-particles may be introduced as a radiation shielding material, thus increasing the collision probability of the radiation shielding material in the form of nano-particles with incident radiation in the shielding member, thereby increasing radiation shielding effects, and as well, the thickness and volume of the shielding member may be decreased compared to shielding members including particles having a size on at least the micro-scale as a shielding material, such that the weight of the shielding member may be reduced and the porosity of the shielding member may be minimized, thereby preventing the shielding effects and the properties of the shielding member from deteriorating due to the presence of pores and enabling the radiation shielding member to be usefully employed as a neutron absorber in spent fuel managing transport/storage environments and the like.

An object of the present invention is to provide a radiation shielding member including nano-particles as a radiation shielding material, which can exhibit superior radiation shielding effects, is lightweight, and can prevent the deterioration of the properties of the shielding member.

Another object of the present invention is to provide a method of preparing the radiation shielding member including nano-particles as a radiation shielding material.

In order to accomplish the above objects, the present invention provides a radiation shielding member and a method for preparing the same, by homogeneously dispersing a radiation shielding material in the form of nano-particles in a polymer matrix or a metal matrix and then performing molding.

DETAILED DESCRIPTION OF THE INVENTION

Figure 1:
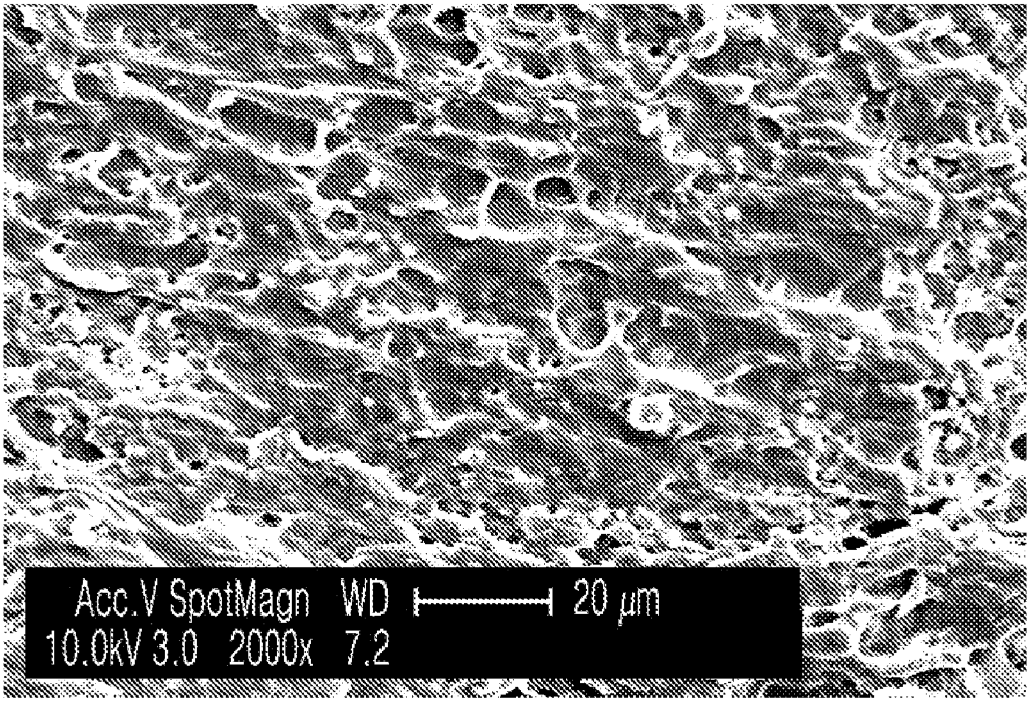
FIG. 1(*a*) shows a scanning electron microscope (SEM) image of the micro-$B_2O_3$/polyvinylalcohol (PVA) composite of Comparative Example 1, and FIG. 1(*b*) shows an SEM image of the nano-$B_2O_3$/PVA composite of Example 1.
Figure 1:
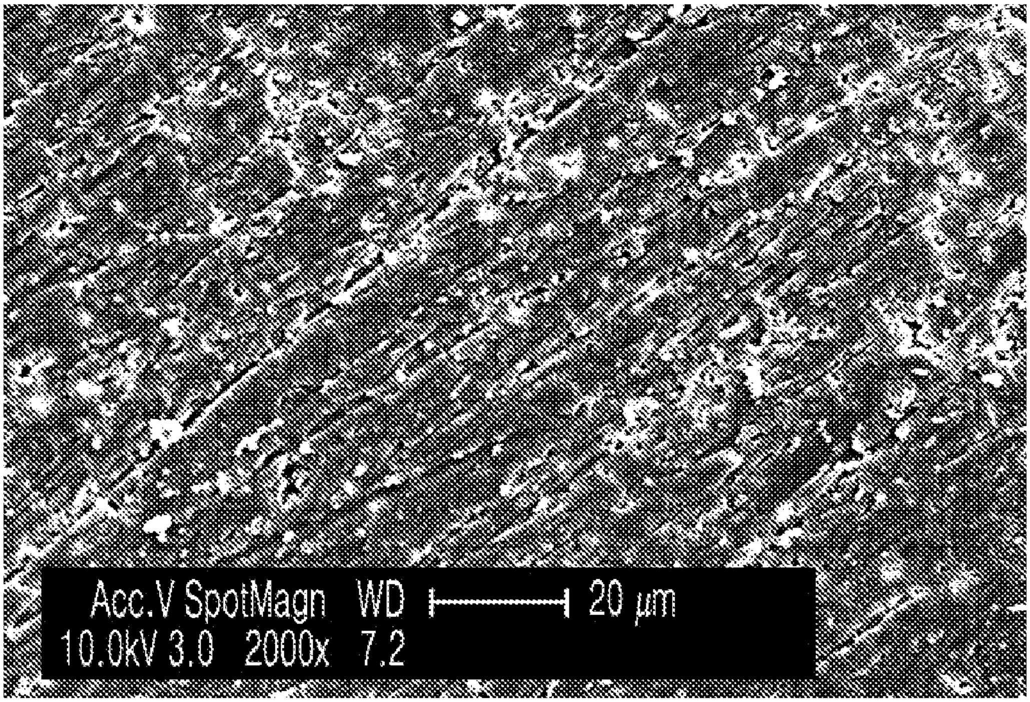
Figure 2:
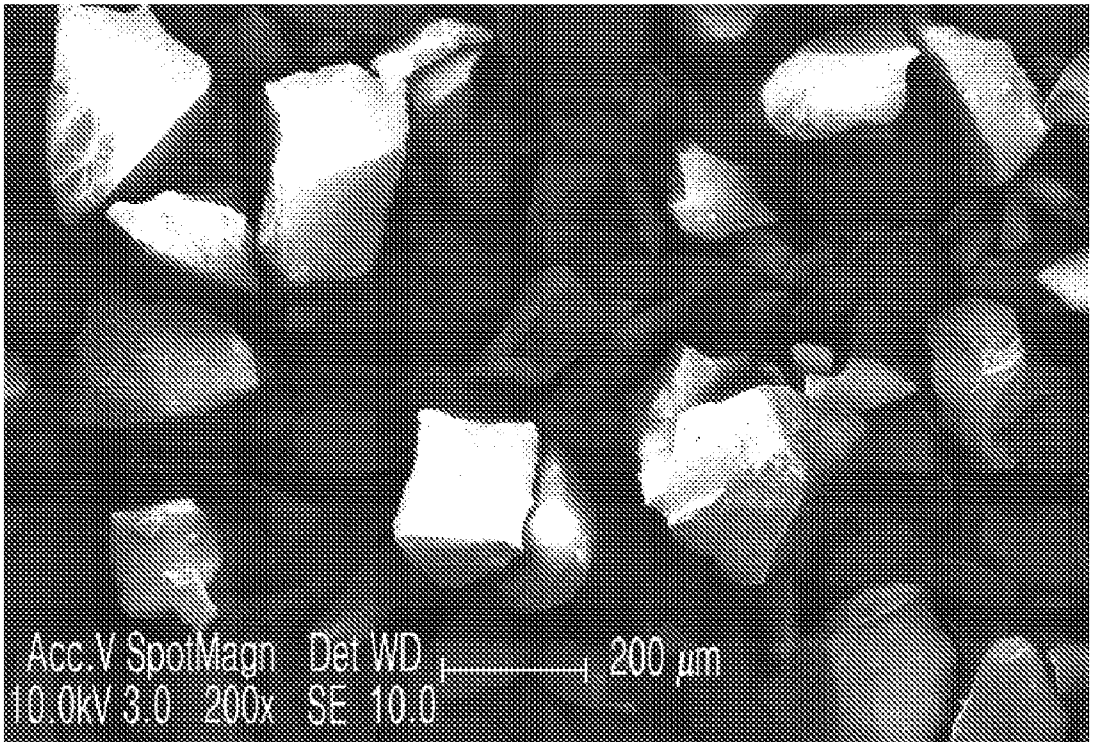
FIG. 2(*a*) shows a transmission electron microscope (TEM) image of the micro-$B_2O_3$/PVA composite of Comparative Example 1, and FIG. 2(*b*) shows a TEM image of the nano-$B_2O_3$/PVA composite of Example 1.
Figure 2:
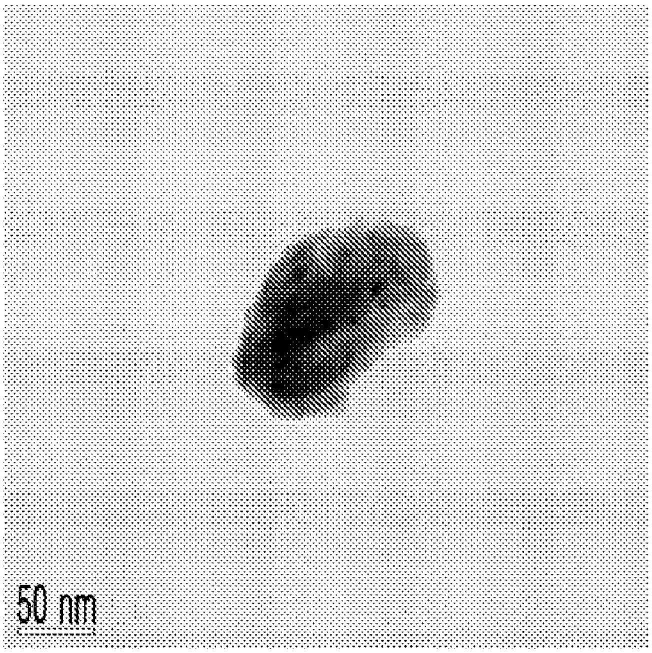

The present invention provides a radiation shielding member prepared by homogeneously dispersing a radiation shielding material in the form of nano-particles in a polymer matrix or metal matrix.

Hereinafter, a detailed description will be given of the present invention.

The radiation shielding member according to the present invention includes a polymer matrix or a metal matrix and a radiation shielding material in the form of nano-particles having a size of 10~900 nm as a result of pulverization, the radiation shielding material being homogeneously dispersed in the matrix. The radiation shielding material in the form of nano-particles may increase the collision probability with incident radiation in the shielding member. Accordingly, the mean free path of the collided radiation may be decreased, thus increasing a probability of absorbing (and decaying) the radiation, consequently effectively shielding the radiation.

The particle size of the radiation shielding material is regarded as an important factor for increasing the collision probability between the incident radiation and the shielding material to thus increase the shielding efficiency. If the particle size is less than 10 nm, it is difficult to prepare the nano-particles. Conversely, if the particle size exceeds 900 nm, the collision probability is reduced in proportion to the exceeding thereof, thus making it difficult to attain the effective radiation shielding efficiency of nano-particles. Such nano-particles may be obtained by mechanically pulverizing a radiation shielding material having a particle size ranging from tens to hundreds of μm using a mechanical activation process by means of a ball mill.

The amount of the radiation shielding material in the form of nano-particles contained in the shielding member according to the present invention may be set to 1.0~20.0 wt % depending on the shielding purpose. If the amount is less than 1.0 wt %, the radiation shielding effects are reduced. Conversely, if the amount exceeds 20.0 wt %, the shielding efficiency may be increased but it is difficult to homogeneously disperse the shielding material in the polymer matrix or metal matrix and the weight of the shielding member is remarkably increased.

Also, the amount of the polymer matrix or metal matrix according to the present invention may be set to 80.0~99.0 wt %. If the amount is less than 80.0 wt %, the deceleration efficiency of fast neutrons is lowered. Conversely, if the amount exceeds 99.0 wt %, the amount of radiation shielding material is decreased, undesirably lowering the shielding efficiency.

Further, the radiation shielding member according to the present invention may be molded to have a porosity of at most 5%. The presence of pores in the shielding member deteriorates the properties of the shielding member and as well impedes the improvement in the radiation shielding effects. Therefore, it is preferred that the radiation shielding member have a porosity as low as possible.

Examples of the radiation to be shielded by the radiation shielding member according to the present invention may include neutrons, gamma rays or X-rays.

In the case where the radiation to be shielded is neutrons, the nano-particles may include boron, lithium, gadolinium, samarium, europium, cadmium, dysprosium, a compound thereof, or a mixture thereof, having a large thermal neutron absorption cross-section. The neutron-absorbing material may be selected depending on the end use or the type of matrix. Particularly useful is boron or a boron compound. Examples of the boron compound may include $B_2O_3$, $B_4C$, $Na_2B_4O_7$, BN, $B(OH)_3$ and the like.

In the case where the radiation to be shielded is gamma or X-rays, the nano-particles may include lead, iron, tungsten, a compound thereof, or a mixture thereof, having a high density.

Also, the shielding member according to the present invention includes the polymer matrix or metal matrix in which the radiation shielding material is dispersed. It is more desirable that the polymer matrix or metal matrix be capable of facilitating the molding to a final shielding member, minimizing the porosity upon mixing with the nano-particles, and additionally exhibiting radiation shielding effects.

Examples of the polymer matrix include, as a polymer effective for decelerating fast neutrons thanks to a high hydrogen density, polyvinylalcohol (PVA), polyethylene (PE), high-density polyethylene (HDPE), low-density polyethylene (LDPE), epoxy, and rubber including synthetic rubber, natural rubber, silicone-based rubber and fluorine-based rubber, and ones mixed thereof. In particular, polyethylene series are useful in terms of hydrogen atom content.

Examples of the metal matrix include, being metals of high density, stainless steel, aluminum, titanium, zirconium, scandium, yttrium, cobalt, chromium, nickel, tantalum, molybdenum, tungsten, and alloys thereof.

The radiation shielding material in the form of nano-particles according to the present invention may be dispersed in the polymer matrix or metal matrix through powder mixing or melt mixing. As such, it is important to homogeneously disperse the radiation shielding material in the form of nano-particles in the polymer matrix or metal matrix. This is because the radiation shielding effects of the shielding member should be uniformly imparted to the entire shielding member.

In the case of using the powder mixing process, there is no difficulty in homogeneously dispersing the nano-particles. However, in the case of using the melt mixing process, the radiation shielding material in the form of nano-particles may aggregate and thus be difficult to homogeneously disperse. To solve the above problems, the nano-particles may be mixed with a surfactant which is the same material as the polymer matrix or metal matrix or which has high affinity for the polymer matrix or metal matrix so that the nano-particles are coated for surface activation, before being dispersed in the polymer matrix or metal matrix. In this way, when the surface of the nano-particles having low affinity for the matrix is coated with the material having high affinity for the matrix, the affinity between the nano-particles and the matrix may be increased, such that the nano-particles in the matrix do not aggregate but are homogeneously dispersed in the entire matrix. In the case where the matrix is a polymer, the same material as the matrix may be optimally used as the surfactant. When such a material cannot be used, polyvinylalcohol, polyethylene, epoxy or rubber may be used. Also, in the case where the matrix is a metal, stainless steel, aluminum, tungsten, titanium or nickel may be used.

Also, with the goal of making the nano-particles more fine and preventing the nano-particles from re-growing due to aggregation, in order to provide more effective dispersion, re-pulverization may be performed through ball milling. The nano-particles thus coated may be forcibly stirred at high speed to homogeneously disperse them in a liquid polymer matrix or metal matrix.

The shielding member according to the present invention is provided as a radiation shielding member having a predetermined shape by subjecting a powder phase or a liquid phase in which the shielding material is homogeneously dispersed in the polymer matrix or metal matrix to typical molding and/or processing. As such, the process used for the molding and/or processing typically includes compression molding, injection molding, extrusion, and casting. In this case, the porosity of the shielding member should be controlled to the minimum.

In addition, the present invention provides a method for preparing the shielding member having improved radiation absorption performance, including pulverizing a radiation shielding material to nano-particles (step 1); mixing the radiation shielding material in the form of the nano-particles obtained in step 1 with a surfactant which is the same material as the polymer matrix or has high affinity for the polymer matrix or a surfactant which is the same material as the metal matrix or has high affinity for the metal matrix, thus realizing surface coating, and simultaneously performing re-pulverization(step 2); and homogeneously dispersing the radiation shielding material in the form of the nano-particles obtained in step 2 in the polymer matrix or metal matrix (step 3).

Below, the method of preparing the radiation shielding member according to the present invention is described in detail in steps.

Step 1

Step 1 according to the present invention is a process of mechanically activating the radiation shielding material, thus preparing the nano-particles. The radiation shielding material may include the aforementioned gamma/X-rays shielding material or neutron shielding material. The mechanical activation may be performed using a ball mill, and ball milling may be conducted at 500~1100 rpm for 5~30 min.

Step 2

Step 2 according to the present invention is a process of subjecting the radiation shielding material in the form of nano-particles obtained in step 1 to coating with a material having high affinity for the polymer matrix or metal matrix, in conjunction with re-pulverization, in order to provide for homogeneous dispersion in the polymer matrix or metal matrix.

Upon melt mixing, the homogeneous dispersion of the nano-particles in the matrix is not easy because of the properties of the nano-particles. To solve this problem, in the present invention, the coating of the nano-particles is conducted in such a manner that the nano-particles are coated with the surfactant which is the same material as the polymer matrix or metal matrix used in the present invention or which has high affinity for the above matrix, thus increasing affinity of the nano-particles for the matrix so as to homogeneously disperse the nano-particles in the matrix. The useful coating material includes the aforementioned surfactant which is the same material as the polymer matrix or metal matrix or which has high affinity for the above matrix. The surface activation or coating of the nano-particles may prevent the particles from re-growing due to aggregation. This effect may be more effectively achieved by performing the pulverization procedure at the same time as the coating process.

In this step, the solvent such as cyclohexane, toluene or normal-hexane may be added with a surfactant for better re-pulverizing and coating to the surface of nano-particles using a wet ball-mill process. Or, for the case of already prepared nano-particles, they may be surface-coated by stir mix with a surfactant in the solvent such as cyclohexane, toluene or normal-hexane.

Step 3

Step 3 according to the present invention is a process of homogeneously dispersing the radiation shielding material in the form of nano-particles obtained in step 2 in the polymer matrix or metal matrix. The dispersed shielding member may be adequately molded to impart the thickness and volume adapted for the end use.

By the preparation method according to the present invention, the thickness and volume of the shielding member are reduced, leading to a lightweight radiation shielding member. The shielding effects of the shielding member may be achieved as a result of pulverizing the radiation shielding material to nano-particles so that the collision probability of the nano-particles with incident radiation in the shielding member is increased to thereby reduce the mean free path of the radiation. Unlike this, in order to accomplish the same shielding effects as in the shielding member including the nano-particles by using particles having a size on at least the micro-scale as a radiation shielding material, because the collision probability with incident radiation should be increased to thus increase the mean free path of the radiation, the shielding material in the form of the particles having a size on at least the micro-scale should be contained in a relatively large amount in the shielding member, consequently undesirably increasing not only the weight of the shielding member but also the volume thereof, namely, the thickness thereof. From this point of view, the radiation shielding member according to the present invention can achieve a light weight, as well as show superior shielding effects.

The radiation shielding member according to the present invention may be efficiently used in fields requiring radiation shielding effects, for example, anti-radiation clothes, spent fuel managing transport/storage environments, spent fuel reprocessing facilities, radiation facilities including accelerators, transport/storage casks of radioactive material, cosmic radiation shields (space shuttles, satellites, etc.), and military radiation shields.

A better understanding of the present invention may be obtained through the following examples, which are set forth to illustrate, but are not to be construed to limit the present invention.

EXAMPLE 1

Preparation of Neutron Shielding Member 1

Step 1. Preparation of Neutron Absorbing Nano-particles

Commercially available boron oxide ($B_2O_3$, High Purity Chemicals, Japan) having a particle size of 200~300 μm was subjected to ball milling at 1000 rpm for about 10 min, thus preparing boron compound nano-particles having a particle size of 100~1000 nm.

Step 2. Surface Activation of Boron Compound Nano-Particles

The boron compound nano-particles obtained in step 1 were subjected to milling at 700 rpm for 60 min with the same amount of PVA, thus reducing the particle size and surface activating (coating) the boron compound nano-particles with PVA. The surface activation of the nano-particles can prevent the increase in the particle size as they collide each other. Thereby, the particle size could be advantageously maintained in the nano scale. In accordance therewith, the average particle size of the boron compound particles thus obtained was 210 nm.

Step 3. Dispersion of Surface-Activated Boron Compound Nano-Particles in Polymer Matrix and Molding The nano-powder in which the boron compound nano-particles containing 2.5 wt % boron were surface-activated with an appropriate amount of PVA was homogeneously dispersed in a PVA polymer matrix and then heat-compressed to a thickness of 0.2 cm, 0.5 cm, 0.75 cm and 1 cm, thus preparing a radiation shielding member including boron compound nano-particles.

EXAMPLE 2

Preparation of Neutron Shielding Member 2

A neutron shielding member was prepared in the same manner as in Example 1, with the exception that the boron compound nano-particles surface-activated with an appropriate amount of PVA, used in step 3, had a boron content of 1.0 wt %.

EXAMPLE 3

Preparation of Neutron Shielding Member 3

Surface-activated $B_4C$ nano-powder (average particle size: about 50 nm) was prepared in the same manner as in steps 1 and 2 of Example 1, with the exception that $B_4C$ was used as the radiation shielding material. Thereafter, the nano-powder thus prepared was melt mixed with a HDPE polymer matrix with forcible stirring, and then injection molded, thus preparing a radiation shielding member. Thus, when using the present process, the nano-particles were confirmed to be homogeneously dispersed not only in the powder mixing but also in melt mixing.

COMPARATIVE EXAMPLE 1

Preparation of Neutron Shielding Member Using Boron Compound Micro-Particles 1

A neutron shielding member containing a neutron shielding material in the form of micro-particles was prepared in the same manner as in Example 1, with the exception that, in step 3, commercially available boron oxide ($B_2O_3$, High Purity Chemicals, Japan) having a size of 200~300 μm was used instead of the boron compound nano-particles.

COMPARATIVE EXAMPLE 2

Preparation of Neutron Shielding Member Using Boron Compound Micro-Particles 2

A neutron shielding member containing a neutron radiation shielding material in the form micro-particles was prepared in the same manner as in Example 2, with the exception that, in step 3, commercially available boron oxide ($B_20_3$, High Purity Chemicals, Japan) having a size of 200~300 μm was used instead of the boron compound nano-particles.

COMPARATIVE EXAMPLE 3

Commercially Available Neutron Shielding Member

A commercially available neutron shielding member (Nelco, USA) in which boron compound ($B_2O_3$) particles having a size of 200~300 μm with 9.0 wt % boron were dispersed in a polyurethane matrix was used.

COMPARATIVE EXAMPLE 4

Commercially Available Neutron Shielding Member

A commercially available neutron shielding member (Nelco, USA) in which boron compound ($B_2O_3$) particles having a size of 200~300 μm with 5.0 wt % boron were dispersed in a HDPE matrix was used.

EXPERIMENTAL EXAMPLE 1

Observation of Boron Nano-Particles Dispersed in Radiation Shielding Member

In order to evaluate the dispersion state of the boron compound nano-particles, the neutron shielding member of each of Example 1 and Comparative Example 1 was observed using SEM and TEM. The results are shown in FIGS. 1(*a*), 2(*a*) for Comparative Example 1 and FIGS. 1(*b*) and 2(*b*) for Example 1.

As shown in FIGS. 1(*a*), 1(*b*), 2(*a*) and 2(*b*), compared to the shielding member of Comparative Example 1 including micro-particles, the boron compound nano-particles could be seen to be homogeneously dispersed in the PVA matrix.

EXPERIMENTAL EXAMPLE 2

Simulation of Radiation Shielding Efficiency Depending on Particle Size of Radiation Shielding Material Using MCNP Transport Code The neutron absorption probability by the shielding member in which 300 μm boron oxide compound particles (a) including boron nuclei having a size of about $10^{-15}$ m were homogeneously dispersed in HDPE and by the shielding member in which 0.5 μm boron oxide compound particles (b) having the same boron nuclei were homogeneously dispersed in HDPE was simulated using MCNP.

Figure 3:
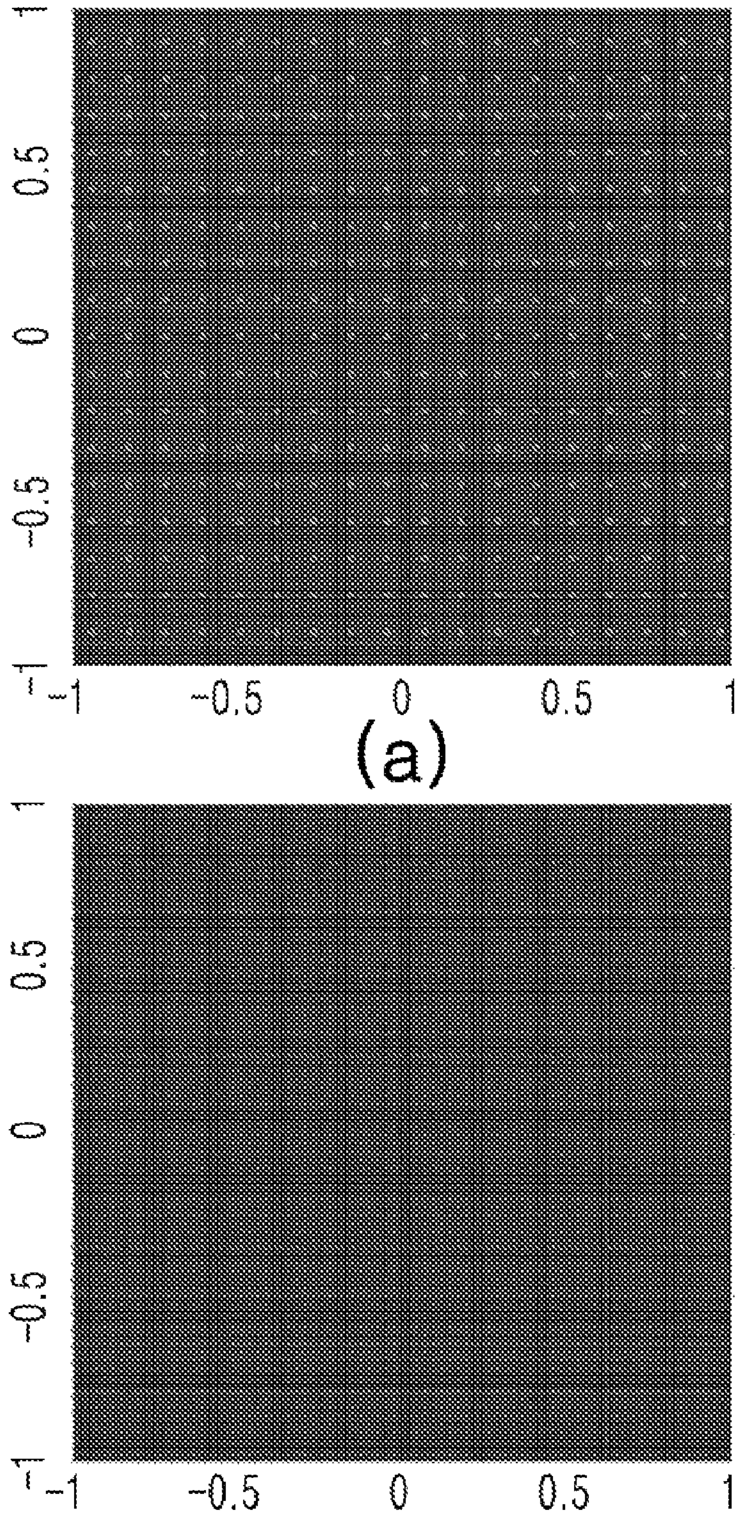
FIG. 3(*a*) shows the Monte Carlo N-particle (MCNP) pixel array of 300 μm boron oxide, and FIG. 3(*b*) shows the MCNP pixel array of 0.5 μm boron oxide, which are the concept of the particle size-dependent MCNP simulation.

Conventional MCNP simulation is unable to calculate the radiation shielding efficiency depending on the particle size. So, in the present invention, simulation was carried out by respectively locating the boron compound particles in the centers of pixels such that the boron oxide compound particles had a size of 300 μm and the boron content was 2.5 wt % and then standardizing these pixels to an array. Also in the case of 0.5 μm boron oxide compound particles, the simulation was performed in the same manner. The basic simulation concept is shown in FIGS. 3(*a*) and 3(*b*).

The above results were compared with simulation results using the conventional MCNP method (because the simulation was conducted under an assumption in which the boron nuclei were homogeneously dispersed, the particle size was set to about $10^{-15}$ m) depending only on the microscopic neutron absorption cross-section of the shielding material and the boron content thereof. The results of neutron absorption efficiency using the particle size-dependent MCNP simulation and the conventional MCNP simulation are shown in FIG. 4.

Figure 4:
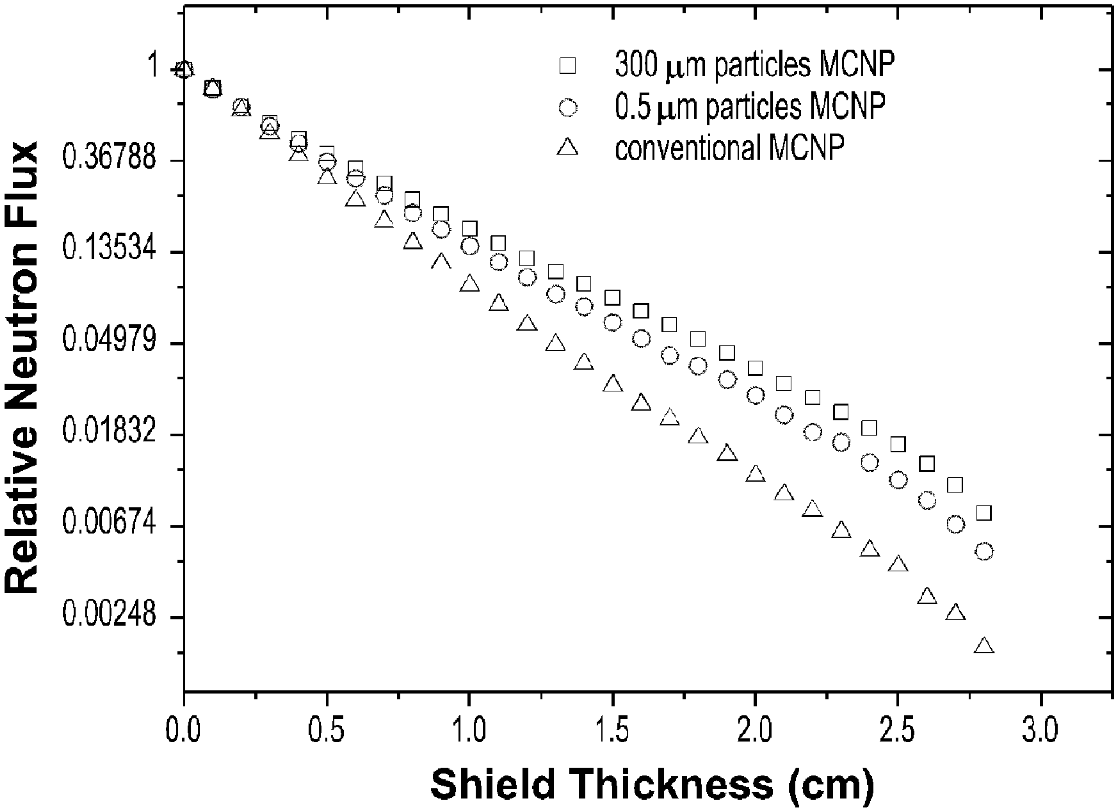
FIG. 4 is a graph showing the radiation shielding efficiency using the MCNP simulation (particle size of the boron compound: 300 μm (□), 0.5 μm (○), and $10^{-15}$ m (Δ, nucleus size in a conventional MCNP))

As shown in FIG. 4, the radiation absorption efficiency of the shielding member (○) including 0.5 μm boron oxide compound particles was increased by about 25~75%, which varies depending on the thickness of the shielding member, compared to the shielding member (□) including 300 μm boron oxide compound particles. The simulation results (Δ) using the conventional MCNP method exhibited a radiation shielding efficiency increased by more than 50%, compared to the above particle size-dependent simulation results. This is considered to be because the conventional MCNP method supposes that the particle size of the radiation shielding material is set to the respective boron nuclei having a size of $10^{-15}$ m which are uniformly distributed.

The MCNP simulation method depending on the particle size according to the present invention may cause an experimental measurement differences in comparison to the conventional MCNP simulation. This is because whereas the conventional MCNP method does not consider the particle size, the actual radiation shielding member includes large shielding particles (boron compounds) in which hundreds to tens of thousands of boron nuclei agglomerate.

EXPERIMENTAL EXAMPLE 3

Measurement of Radiation Shielding Efficiency

The neutron shielding efficiency of Examples 1 and 2 and Comparative Examples 1 to 4 was measured and calculated in compliance with the following procedures.

The thermal neutron shielding efficiency may be calculated using Equation 1 below.

$$I(t)=I_o e^{\Sigma_{th} t} \qquad \text{Equation 1}$$

wherein $I_o$ is the incident neutron beam flux (n/cm$^2$/s) t is the thickness (cm) of the shielding member, $\Sigma_{th}$ is the macroscopic thermal neutron absorption cross-section (cm$^{-1}$) which is given as Nσ in which N is a number density (number of atoms/cm$^3$) of the neutron shielding material and σ is the microscopic thermal neutron absorption cross-section (cm$^2$) which is an intrinsic value of the material and is experimentally measured. The mean free path ($\lambda_{th}$) of the neutron is represented by $1/\Sigma_{th}$ as an inverse number of $\Sigma_{th}$.

By the use of the FCD (Four Circle Diffractometer) at a Hanaro Center in the Korea Atomic Energy Research Institute, a thermal neutron source having a wavelength of about 0.997 Å and a flux of about $6.6\times10^5$ n/cm$^2$/s was radiated onto the shielding member for 10 sec. Then, using a He-3 proportional counter as a detector spaced apart from the sample by about 2 m, the number of neutrons passing through the shielding member depending on the shield thickness and the content was subjected to at least ten measurements, after which the measured values were averaged.

Figure 5:
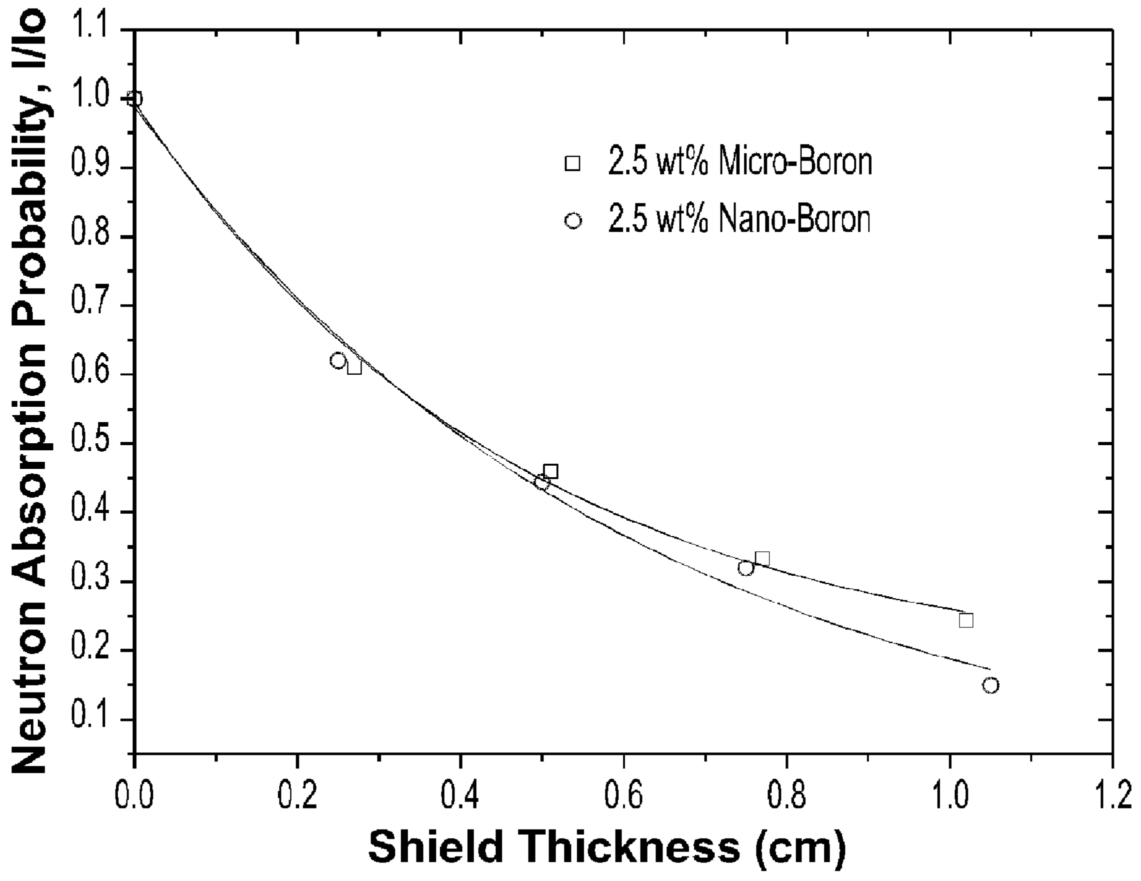
FIG. 5 is a graph showing the shielding efficiency of the radiation shielding material (boron content: 2.5 wt %) (Example 1(○), Comparative Example 1(□))

As shown in FIG. 5, the neutron shielding member including boron compound particles of 2.5 wt % boron had a tendency to increase the shielding efficiency in proportion to the thickness thereof. At the same thickness, the shielding efficiency of Example 1 (○) having smaller boron compound particles was superior to that of Comparative Example 1 (□).

Figure 6:
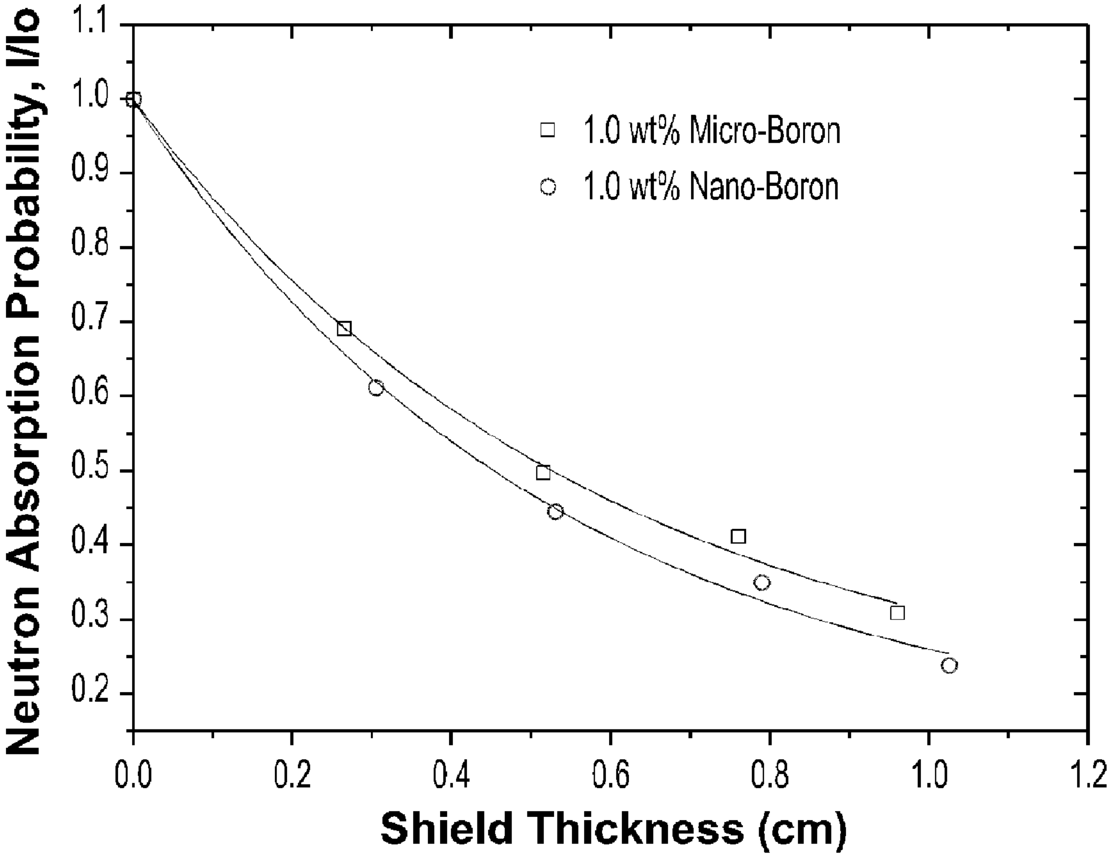
FIG. 6 is a graph showing the shielding efficiency of the radiation shielding material (boron content: 1.0 wt %) (Example 2(○), Comparative Example 2(□)).

As shown in FIG. 6, the shielding member including boron compound particles of 1.0 wt % boron had a tendency to increase the shielding efficiency in proportion to the thickness thereof, as in the case shown in FIG. 5. At the same thickness, the shielding efficiency of Example 2 (○) having smaller boron compound particles was superior to that of Comparative Example 2 (□).

From the ratio of the number of neutrons passed through the shielding member to the number of incident neutrons, the thermal neutron absorption cross-section ($\Sigma_{th}$) and the mean free path ($\lambda_{th}$) were calculated. The results are shown in Table 1 below.

Consequently, in the case where the particle size was small, the mean free path ($\lambda_{th}$) was reduced by at least 15%, thus increasing the neutron shielding efficiency.

TABLE 1

Thermal Neutron Absorption Cross-Section & Mean Free Path

| | Boron (wt %) | Macroscopic Thermal Neutron Cross-Section, $\Sigma_{th}$ (cm$^{-1}$) | Thermal Neutron Mean Free Path, λ (cm) |
|---|---|---|---|
| Ex. 1 | 2.5 | 1.72 | 0.58 |
| Ex. 2 | 1.0 | 1.42 | 0.70 |
| C. Ex. 1 | 2.5 | 1.49 | 0.67 |
| C. Ex. 2 | 1.0 | 1.25 | 0.80 |
| C. Ex. 3 | 9.0 | 2.21 | 0.45 |
| C. Ex. 4 | 5.0 | 1.45 | 0.69 |

As is apparent from Table 1, Example 1 having the same boron content as Comparative Example 1 had the macroscopic thermal neutron absorption cross-section increased by about 15%, and Example 2 having the same boron content as Comparative Example 2 had the macroscopic thermal neutron absorption cross-section increased by about 14%. Also, as is apparent from Table 1, the shielding member including 1.0 wt % nano-boron could show neutron shielding performance similar to that of the shielding member including 2.5 wt % micro-boron, thereby enabling the weight of the shielding member to be reduced.

Further, as seen in Table 1, as commercially available products from Nelco, USA, Comparative Examples 3 and 4 had the boron content 3.6 times and 2 times respectively that of Example 1, and 9 times and 5 times respectively that of Example 2. Nevertheless, these comparative examples merely had the thermal neutron absorption cross-section 1.28 times and 0.84 times respectively that of Example 1 and 1.55 times and 1.02 times respectively that of Example 2. From these results, compared to Comparative Examples 3 and 4 including micro-particles, the neutron shielding member of Examples 1 and 2 according to the present invention had a much smaller amount of the radiation shielding material, but could be seen to exhibit similar shielding effects and in some cases superior effects.

In Comparative Example 3 in which many pores were present in the shielding member due to the use of polyurethane as the polymer matrix, the degree of improvement in the shielding effect was insignificant despite the presence of a much greater amount of boron compound compared to Examples 1 and 2. This is considered to be because the shielding member including the polyurethane matrix has 90% porosity and is thus reduced in shielding effects.

Therefore, even when the radiation shielding member of the present invention includes a smaller amount of the radiation shielding material compared to the conventional radiation shielding member, superior radiation shielding effects versus the amount used can be exhibited. Further, the lightweight radiation shielding member can be realized.

As described hereinbefore, the present invention provides a radiation shielding member including nano-particles as a radiation shielding material and a preparation method thereof. According to the present invention, the radiation shielding member in which the radiation shielding material in the form of nano-particles is homogeneously dispersed in a matrix can increase the collision probability of the shielding material with radiation, compared to conventional shielding members including, as a radiation shielding material, particles of at least a micro-scale size. Hence, the mean free path of the radiation in the shielding member is reduced, thus exhibiting radiation shielding effects superior to conventional radiation shielding members. As well, under a condition of the same density, the shielding member according to the present invention can have decreased thickness and volume, thus enabling the weight of the shielding member to be reduced. Further, the porosity of the shielding member can be minimized, thereby preventing the shielding effects and the properties of the shielding member from deteriorating attributable to the presence of pores and enabling the shielding member according to the present invention to be usefully employed in spent fuel managing transport/storage environments and the like.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A shielding member having improved radiation absorption performance, comprising 80.0~99.0 wt % of a polymer matrix or metal matrix and 1.0~20.0 wt % of a radiation shielding material which is provided in a form of nano-particles having a size of 10~900 nm as a result of pulverization, to increase a collision probability with radiation, wherein the radiation shielding material is homogeneously dispersed in the polymer matrix or metal matrix through powder mixing or melt mixing after surface treatment with a surface treating material which is a same material as the polymer matrix or metal matrix or which has high affinity for the polymer matrix or metal matrix.

2. The shielding member as set forth in claim 1, wherein the radiation is neutrons, gamma rays or X-rays.

3. The shielding member as set forth in claim 1, wherein when the radiation is neutrons, the nano-particles comprise any one selected from the group consisting of boron, lithium, gadolinium, samarium, europium, cadmium and dysprosium, a compound thereof, or a mixture thereof.

4. The shielding member as set forth in claim 1, wherein when the radiation is gamma rays or x-rays, the nano-particles comprise any one selected from the group consisting of lead, iron and tungsten, a compound thereof, or a mixture thereof.

5. The shielding member as set forth in claim 1, wherein the polymer matrix comprises any one or more selected from the group consisting of polyvinylalcohol (PVA), polyethylene (PE), high density polyethylene (HDPE), low density polyethylene (LDPE), epoxy, and any one or more rubber selected from the group consisting of synthetic rubber, natural rubber, silicone-based rubber and fluorine-based rubber.

6. The shielding member as set forth in claim 1, wherein the metal matrix comprises any one or more selected from the group consisting of stainless steel, aluminum, titanium, zirconium, scandium, yttrium, cobalt, chromium, nickel, tantalum, molybdenum and tungsten, or an alloy thereof.

7. The shielding member as set forth in claim 1, wherein the nano-particles are subjected to the surface treatment with the surfactant which is the same material as the polymer matrix or metal matrix or which has high affinity for the polymer matrix or metal matrix, in conjunction with re-pulverization for preventing the nano-particles from re-growing due to aggregation.

8. The shielding member as set forth in claim 1, wherein the pulverization is performed through ball milling.

9. The shielding member as set forth in claim 7, wherein the re-pulverization is performed through ball milling.

10. The shielding member as set forth in claim 1, wherein the surfactant which is the same material as the polymer matrix or which has high affinity for the polymer matrix comprises any one or more selected from the group consisting of polyvinylalcohol (PVA), polyethylene (PE), epoxy, and rubber, and the surfactant which is the same material as the metal matrix or which has high affinity for the metal matrix comprises any one or more selected from the group consisting of stainless steel, aluminum, tungsten, titanium, and nickel.

11. The shielding member as set forth in claim 1, wherein the radiation shielding material in the form of the nano-particles reduces a thickness and a volume of the shielding member.

12. The shielding member as set forth in claim 1, wherein the shielding member is used for one or more selected from the group consisting of anti-radiation clothes, spent fuel managing transport/storage environments, spent fuel reprocessing facilities, radiation facilities including accelerators, transport/storage casks of radioactive material, cosmic radiation shields including space shuttles and satellites, and military radiation shields.

13. A method for preparing the shielding member having improved radiation absorption performance of claim 1, comprising:

pulverizing a radiation shielding material to nano-particles;

mixing the radiation shielding material in a form of the nano-particles with a surface treating material which is a same material as a polymer matrix or metal matrix or which has high affinity for the polymer matrix or metal matrix, thus realizing surface coating, and simultaneously performing re-pulverization; and homogeneously dispersing the radiation shielding material in the form of the nano-particles in the polymer matrix or metal matrix.

* * * * *